(No Model.)
J. A. HOLLEM.
ANIMAL TRAP.
No. 245,266. Patented Aug. 2, 1881.
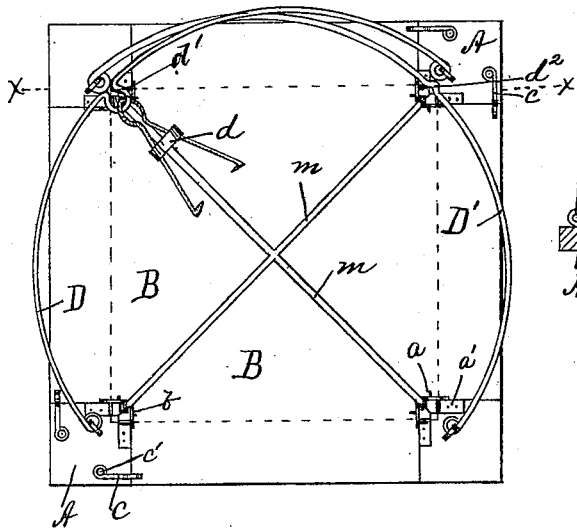
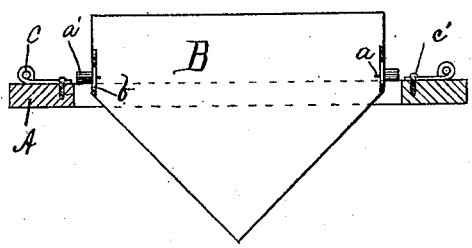
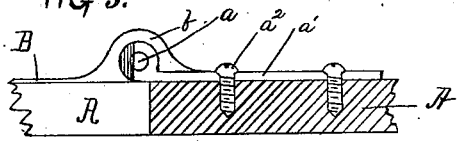
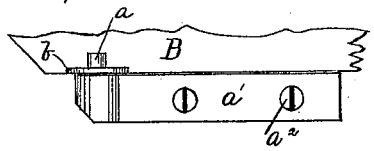
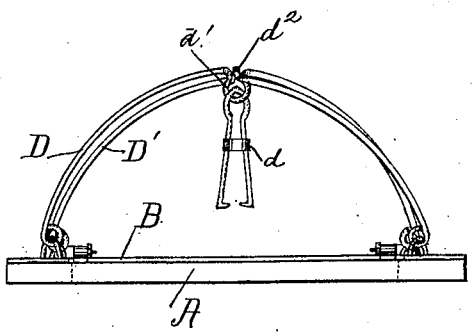
Witnesses:
Everett Brown
William Prescott
Inventor:
John A. Hollem
by Munday Evarts & Adcock
his attys

UNITED STATES PATENT OFFICE.

JOHN A. HOLLEM, OF CHICAGO, ILLINOIS.

ANIMAL-TRAP.

SPECIFICATION forming part of Letters Patent No. 245,266, dated August 2, 1881.

Application filed January 21, 1881. (No model.)

*To all whom it may concern:*

Be it known that I, JOHN A. HOLLEM, of Chicago, in the county of Cook and State of Illinois, have invented certain Improvements in Animal and Bird Traps, of which the following is a specification.

This invention relates to the class of traps shown in Letters Patent to me, dated February 24, 1880, and numbered 224,910. My object therein has been to adapt the trap to the catching of birds as well as animals, and to simplify and cheapen its construction.

The nature of the improvement consists in certain features of construction fully explained below and illustrated in the accompanying drawings, wherein—

Figure 1 is a plan, and Fig. 2 a side, view of my improved trap. Fig. 3 is a section thereof on the line $x$ $x$ of Fig. 1, showing one of the platforms tipped. Figs. 4 and 5 are details, upon an enlarged scale, of the hinges upon which the trap-platforms swing.

Like letters indicate like parts in all the figures in which they are used.

In the drawings, A represents the frame, which is square or round, as preferred.

B B are trapping-platforms, tapering to a point at the center of the frame where they all meet, and with broad square outer ends, the latter being preferably as wide as the dimensions of the frame will conveniently permit. At the corners of the frame these platforms are provided with ears $b$, extending upward from the horizontal plane of the platforms, as shown. These ears are pierced and receive the pivot $a$, held by the strap $a'$, secured to the frame by screws $a^2$. Upon the pivots $a$ the platform tips to precipitate the animal or bird into the receptacle over which the trap is placed. Said pivots are located directly over the gravity-center of the platform when the latter is in a horizontal position, so that the platform will yield very readily to a slight weight upon its inner end. This insures a quick tip, so that the animal is precipitated below before it has time to recover itself. Another peculiarity of this location of the axis is that nearly two-thirds of the distance from the point to the outer edge of the platform is upon the inner side of the axis. These two features combined prevent any tendency by the platform to lodge in a tipped position and render certain and speedy its return to the horizontal; and this inclination to return to the same horizontal position with the pivots above continues when the platform is tipped past a perpendicular position, so that if left free it is sure to go back of its own accord.

Where it is desired to educate the animal to a sense of security in trusting himself upon the platform I provide each of the series of platforms with a separate locking device, consisting of a button, $c$, formed of wire, with an eye through which a screw, $c'$, is passed, and whereby it is secured to the frame. A double button, pivoted at its center, may be used instead of these separate or single buttons, if desired.

To adapt this trap to use for bird-catching, and to guide the animal or bird so it will approach the bait centrally over some one of the platforms, I suspend the bait by means of a clamp, $d$, hanging from an eye, $d'$, in one of the bails, D, which is kept upright by another bail, D', crossing the first at right angles, and both secured to the frame at the corners, so that said bails are directly over the division-lines $m$ between the platforms. Thus the animal is deflected from any path wherein he would be apt to touch more than one of the platforms, which is an obvious advantage. In the case of birds, also, the two bails, crossing each other at the center, as shown, form a sort of cage, which will prevent spreading of the wings in some measure and render escape more difficult.

As shown in Fig. 1, the bails are folded flat upon the frame; and it is thus seen that the trap will occupy but a limited space when packed. It will also be seen, however, that the bails, being thus pivoted at opposite corners, will, when raised, occupy the positions and perform the functions above described. To secure them together when raised, the bail D' has an upward bend, $d^2$, like an inverted V, which sets down into the upper portion of the eye $d'$, as will be understood from Figs. 1 and 5.

I claim—

1. The trap consisting of the frame, the unweighted and unlocked platforms B, shaped as shown, and hinged by pivots located as also shown—that is, directly over their gravitycenters and outside the middle line between their inner points and outer edges—and a bait-holding device located over the points of the platform, substantially as specified.

2. The combination, with the frame A and the series of tipping platforms tapering to a point at the center of the frame, of the bails D and D', crossing each other at right angles and secured at opposite corners of the frame, substantially as specified.

JOHN A. HOLLEM.

Witnesses:
 EDW. S. EVARTS,
 EVERETT BROWN.